United States Patent [19]

Wloszek

[11] 3,708,079

[45] Jan. 2, 1973

[54] SUPPORT FOR ROTATING AND ADVANCING CYLINDRICAL MEMBERS

[75] Inventor: Joseph T. Wloszek, Seven Hills, Ohio

[73] Assignee: Custom Machine, Inc., Cleveland, Ohio

[22] Filed: Feb. 12, 1971

[21] Appl. No.: 114,998

[52] U.S. Cl. ................................................ 214/338
[51] Int. Cl. ............................................ B65h 51/00
[58] Field of Search ........................ 214/338, 339, 340

[56] References Cited

UNITED STATES PATENTS

| 2,765,011 | 10/1956 | Jackson | 214/339 X |
| 2,765,903 | 10/1956 | Watts et al. | 214/338 |
| 3,074,605 | 1/1963 | Shaw | 214/339 X |
| 3,434,610 | 3/1969 | Wilson | 214/339 |

Primary Examiner—Drayton E. Hoffman
Assistant Examiner—Frank E. Werner
Attorney—Meyer, Tilberry and Body

[57] ABSTRACT

Apparatus for simultaneously rotating and longitudinally advancing cylindrical members through a test stand. The member is supported in a trough formed by a plurality of axially spaced idler rollers mounted on a first common shaft and a plurality of spaced belts each rotating over a pair of spaced pulleys, with one pulley of each pair being mounted on the first common shaft and the other pulley of each pair being mounted on a second common shaft parallel to the first shaft. The pulleys have a self aligning mounting on their respective shafts such that the plane of rotation of the pulleys may be at an angle other than perpendicular to the axis of their supporting shafts. One of the shafts is axially adjustable relative to the other so as to change the angle of the line of movement of all the belts relative to the axis of the shafts. One of the shafts is driven and has a driving connection with at least some of the pulleys mounted thereon. By relatively moving the two shafts and thus changing the angle of the belts relative to the axes of the shafts, a cylindrical member supported in the trough may be made to move axially forward backward, or remain stationary while being rotated at a constant speed.

8 Claims, 6 Drawing Figures

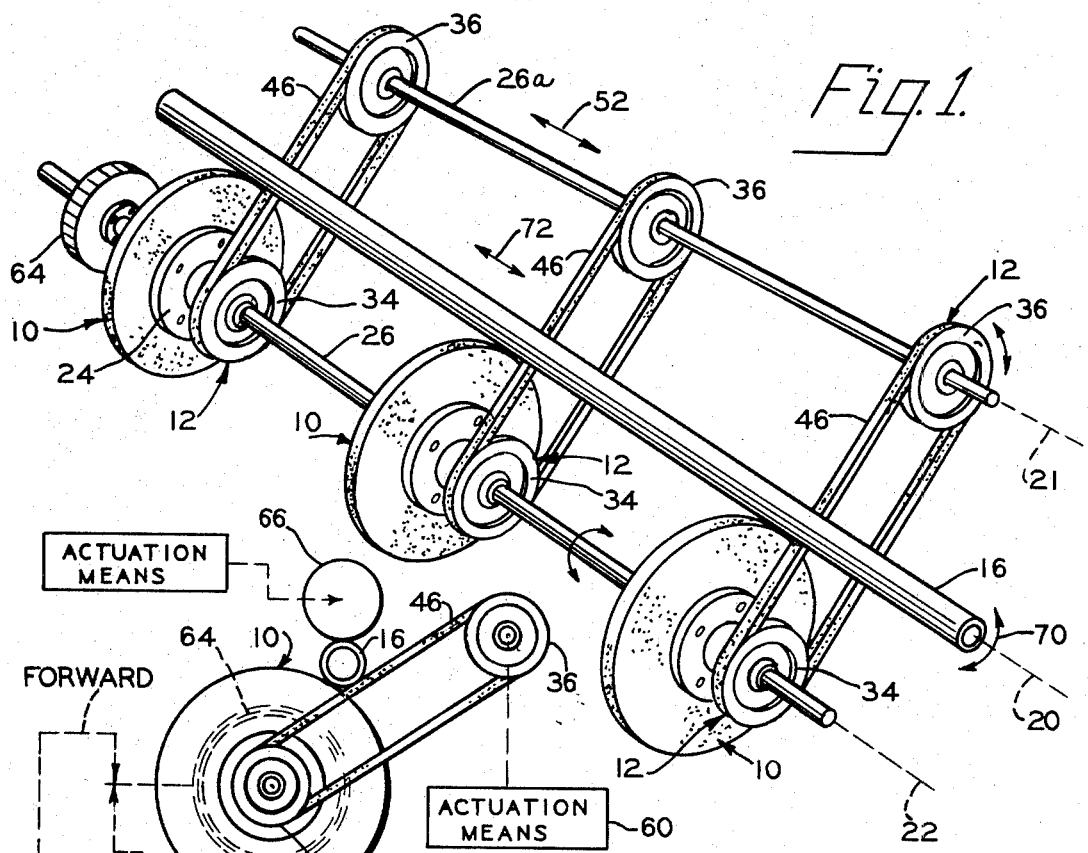
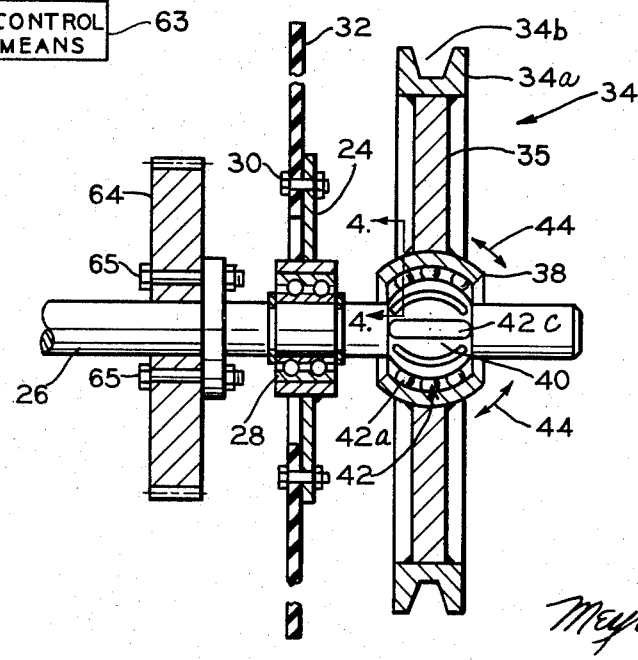

INVENTOR.
JOSEPH T. WLOSZEK
BY
Meyer, Tilberry & Body
ATTORNEYS.

SUPPORT FOR ROTATING AND ADVANCING CYLINDRICAL MEMBERS

This invention pertains to the art of the handling of elongated cylindrical members and more particularly to means for simultaneously rotating and longitudinally moving an elongated cylindrical member past a test point.

The invention is particularly applicable to the simultaneous rotation and longitudinally moving of a pipe or solid cylindrical rod past an ultrasonic test head and will be described with particular reference thereto although it will be appreciated that the invention has broader applications and can be used in any application where a cylindrical member must be both rotated and moved past a fixed point at a controlled rate of speed either forward or backwards.

In the art of ultrasonic testing of pipe or other cylindrical objects, it is conventional to simultaneously rotate and axially advance the pipe past a fixed point in test apparatus where a sensing head such as an ultrasonic head or an eddy current test head is located. In effect the test apparatus scans a helical path on the surface of the pipe, the pitch of which helics varies depending upon the rate of advancement of the pipe for each revolution. Often times it is necessary to vary this pitch from a positive or negative pitch where the pipe is advanced or retracted past the test head to a zero pitch where the pipe simply rotates without advancing in either axial direction.

Heretofore there have been many and various complicated arrangements for accomplishing this purpose. Most of such arrangements have comprised elaborate rolls and supporting arrangements for the rolls and elaborate driving mechanisms. For example, in one such arrangement a plurality of rollers were arranged in two spaced rows so that the rollers formed a trough into which the cylindrical members were supported. The planes of rotation of the rollers were then varied relative to the axis of the cylindrical member and the rollers were all driven from a common power source. In one such arrangement power transmitting universal joints and slip joints were required between each roller. In another arrangement as set forth in my copending patent application Ser. No. 108,807, filed Jan. 22, 1971, entitled "IMPROVED CONVEYOR," the rollers were provided with a spherical surface and were driven from below by a common driving roll which engaged the lower portions of the rollers and drove them by friction.

Complex apparatus has been particularly true where this type of feed mechanism has been associated with testing equipment. For example, in testing of pipe for structural quality in an ultrasonic testing apparatus, it is many times necessary to quickly and accurately alter the feed rate of the pipe relative to the rotational speed as when a defect is noted, or to even reverse the direction of feed, or to control the rate of feed between a high normal rate and a much slower rate when faults are detected. Therefore, to achieve this kind of feed control for pipe or other cylindrical objects in a testing apparatus, the feed mechanism has been necessarily complicated to accomplish these variable objectives within the same feed apparatus.

The present invention provides a new and improved apparatus which is relatively simple in construction, economical to operate and which permits accurate control of the axial feed rate of the cylindrical member.

In accordance with the preferred embodiment of the present invention, apparatus of the general type described is provided comprised of a plurality of spaced idler rollers mounted on a first common shaft and a plurality of spaced belts each rotating over a pair of spaced pulleys. One pulley of each pair is mounted on the first common shaft and the other pulley of each pair is mounted on a second common shaft parallel to and vertically above the first shaft. The idler rollers and belts form an upwardly facing V-shaped trough in which the cylindrical member is adapted to be positioned. The pulleys on one shaft have a self aligning driving connection with the shaft while the pulleys on the other shaft have at least a self aligning mounting whereby the planes of rotation of the pulleys may be at an angle other than perpendicular to their supporting shafts. The two shafts are axially adjustable relative to each other so that the angle of the line of movement of all of the belts relative to the axes of the shaft may be simultaneously adjusted. A workpiece supported in the trough formed by the belts and the idler rollers is rotated and depending upon the angle of the line of movement of the belts relative to the axes of the shafts will either be advanced in a forward or reverse direction or remain axially stationary while being continuously rotated at a constant speed.

The idler rollers are preferably provided with a flexible edge such as not to interfere with the axial movement of the cylindrical member.

In accordance with a more general embodiment of the invention there is provided a pair of rotatable roll means arranged with respect to each other to define a V-shaped trough therebetween whereby both roll means in cooperation fully support said member in the trough, means to rotatably drive at least one of the roll means to impart rotation to said member about its axis of rotation, means to adjust the horizontal component of the angle of the plane of rotation of at least one of the roll means in relation to the axis of rotation of said member, a plurality of said pairs of roll means arranged in spaced series cooperating and angularly adjustable relationship to support and control the feed of said member along the full length thereof.

Preferably both roll means are of a resilient and highly frictional material such as rubber so that they make good frictional driving contact with the pipe simply by the force of gravity acting on the pipe. However, a hold down roll or rolls can be utilized to insure proper frictional contact of the pipe with the roll means.

The principal object of the invention is to provide an extremely simple, and yet highly reliable and accurate rotating and feed control apparatus for pipe or similar cylindrical members.

A further object of the invention is to provide a rotating and advancing apparatus for a cylindrical member whereby with constant speed of rotation the rate of feed or advancement per revolution can be quickly and accurately controlled so that the feed is forward or reverse, or at any desired feed rate, even including a variable rate, if desired.

A further object of the invention is to provide a feed apparatus for cylindrical members which is particularly designed to be incorporated with a testing apparatus for the object being advanced or fed.

The invention may take physical form in certain parts and arrangement of parts, a preferred embodiment of which will be described in detail in the specification and illustrated in the accompanying drawings which form a part hereof and wherein:

FIG. 1 is a perspective illustration of the cooperating feed roll means and how feed control to a pipe is accomplished by a preferred embodiment of the invention;

FIG. 2 is a front elevation partial block diagram schematic of the invention of FIG. 1;

FIG. 3 is an enlarged cross-sectional view partially broken away of the drive roll and of one of the V-belt pulleys of FIGS. 1 and 2;

Figure 4:
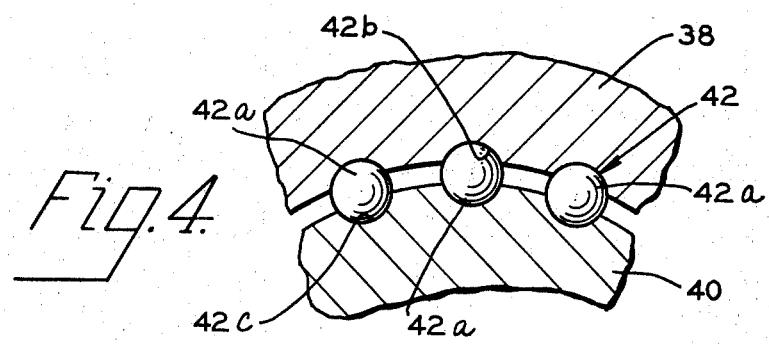
FIG. 4 is an enlarged broken away cross-sectional view of the pulley arrangement to the drive shaft taken on line 4—4 of FIG. 3.

Referring now to the drawings wherein the showings are for the purposes of illustrating a preferred embodiment of the invention only and not for the purpose of limiting same, and more particularly with reference to FIG. 1, the numeral 10 indicates generally a plurality of first roll means, and the numeral 12 indicates generally a plurality of second roll means which are positioned adjacent and in cooperating relationship with respect to each other so as to form an upwardly facing substantially V-shaped trough between their outer peripheral surfaces. A cylindrical member 16, which in this case is an elongated hollow pipe, is positioned in the trough and thus supported by both roll means over a substantial portion of its length. With the plurality of cooperating roll means series aligned and providing similar support, the longitudinal axis, illustrated by dotted line 20, of the member 16 is substantially parallel to the longitudinal axis 22 of the first roll means 10 and remains so during the feed. The axis 22 is preferably contemplated to be fixed. It should be understood that while only three pairs of cooperating roll means 10 and 12 are illustrated, any number of these could cooperate together in series alignment at any desired interval spacing to transport or feed a long pipe or member over a long distance.

The roll means 10 and 12 for any cooperating pair are generally similar, and hence the explanation hereinafter applies to any additional roll pairs of this type. Each first roll means 10, as best illustrated in FIG. 3, is preferably just an idler roll and comprises a metallic hub 24 which is maintained in rotatable relationship to shaft 26 by a bearing 28. Secured to the hub 24 by bolts 30 is a substantially flat thin annular disc 32 preferably made of some substantially resilient material such as rubber or the like, but which has sufficient stiffness to provide adequate support to member 16 as will be more fully explained hereinafter. However, it is desirable that the wheel 32 flex somewhat during the feeding operation to allow the pipe to feed at a selected rate without undue frictional restraint. Suffice it to say, however, that the plurality of roll means 10 are designed to be extremely simple and inexpensive with it having a size and strength commensurate with the size and weight of the pipe which it will be partially supporting.

The second roll means 12 comprises a pair of V-belt pulleys indicated respectively by numerals 34 and 36 in FIG. 1 and an associated V-belt 46. The pulleys are similar in structure, and hence only the pulley 34 will be described in detail and is more particularly illustrated in FIG. 3. Basically, the pulley 34 comprises an outer shell or rim 34a having at least one circumferentially extending V-belt groove 34b around the outer periphery thereof in a conventional manner. Naturally, only a single groove with corresponding V-belt would meet the objects of the invention, and in a system where a plurality of units such as roll means 10 and 12 were used in series, it would be preferable to use a single V-belt to minimize upkeep and cost. However, it should be understood that in many instances multiple V-belts operating from the same pulley to provide a wide support would meet the objects of the invention.

The outer rim 34a is supported by a substantially annular hub 35 which is welded in centrally positioned relationship thereto, and which hub 35 terminates in an inner bearing housing 38. The housing 38 cooperates with an enlarged ball 40 which may be integrally formed with shaft 26 or otherwise attached as a separate component to support the bearing housing 38 with respect to shaft 26 to form a ball joint 42. By means of suitable ball bearings indicated by numeral 42a between the housing 38 and ball 40, the pulley 34 is capable of tilting movement relative to shaft 26 in the direction of the double ended arrows 44. Also the pulley 34 is driven to rotation by the shaft 26 by the balls 42a in the ball joint 42 riding in longitudinally extending cooperating grooves in the inner surface of housing 38 and on the outer surface of ball 40. This relationship is best illustrated in FIG. 4 which shows the cooperating grooves 42b in the housing 38 and 42c in the ball joint 40.

It should be understood that the pulley 36 is identical in its pivotal relationship to shaft 26a although since shaft 26a need not be rotated to effect any driving action, the splined relationship of the housing 38 and ball 40 is not necessary. Thus it is seen that the pulleys 34 and 36 can pivot or tilt about a point on its respective supporting shaft while rotating. When the V-belt extends between the pulleys 34 and 36, the pulleys will self-align by pivoting about their ball joints 42 on the respective shafts so that the V-belt is appropriately aligned. Further, it should be understood that while the pulleys 34 and 36 are illustrated as having only one V-belt 46 thereon, any number of V-belts might be utilized again depending upon the weight and size of the member 16, and the desired support necessary between the V-notch 14 formed by the V-belt 46 and the outer periphery of roll means 10.

Thus, in essence, the roll means 12 actually comprises the pulleys 34 and 36 each mounted for limited pivotal movement about a respective enlarged ball joint 42 on their mounting shafts 26 and 26a to attain self-alignment, and an appropriate conventional V-belt 46.

Suitable means, not shown, may be provided for holding the pulleys 34, 36 apart and the belt 46 in tension.

It is an essential feature of the invention as illustrated in the preferred embodiment of FIG. 1 that the shaft 26a be substantially aligned in parallel relationship to the axes 20 and 22, of the pipe 16 and first roll means 10, respectively, and dotted line 21 shows this relationship. The control feature of the invention is achieved because the shaft 26a is slideable in the direction of the double ended arrow 52 or in the direction of its longitudinal axis 21. An appropriate bearing support for shaft 26a which allows the sliding actuation in the direction of arrow 52 may be provided.

OPERATION OF THE INVENTION

Figure 5:
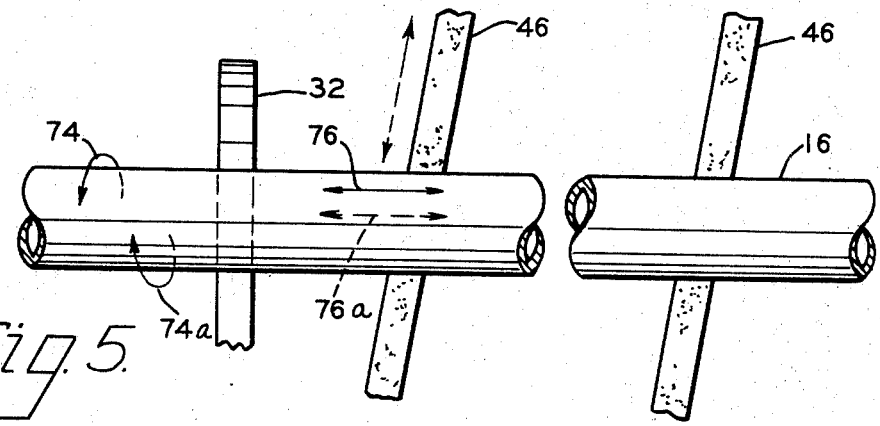
FIG. 5 and 6 are enlarged broken away illustrations showing the variable angular relationship of the roll means to the pipe and how the change in angular relationship or direction of rotation controls the feed of the pipe or cylindrical member.
Figure 6:
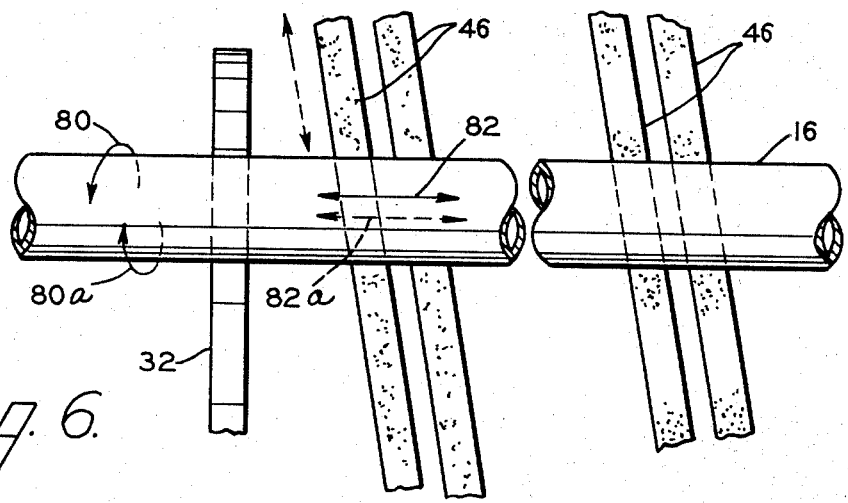

Now, with respect to FIGS. 2, 5 and 6 the operation of the invention to provide a controlled feed to pipe member 16 will be described. Specifically, the preferred embodiment of the invention contemplates that some appropriate actuation means 60 will provide a controlled sliding longitudinal movement to shaft 26a in the direction of arrow 52. This might be a hydraulic cylinder, a screw feed, or any other appropriate mechanical or electrical means well known and understood by those skilled in the art. A drive means indicated by block 62 provides rotatable driving actuation to shaft 26, for example, through an appropriate gear 64 secured thereto by bolts 65 as illustrated in FIG. 3. The drive means, of course, could be an electric motor, or any suitable mechanical device to provide rotatable drive to shaft 26 through gear 64, for example. Further, the drive means 62 will normally include some conventional forward or reverse drive control as well as an r.p.m. control. Obviously, as soon as shaft 26 is rotated, it effects rotation of roll means 12, because it is affixed to rotate with shaft 26. This causes the pipe 16 and the idler support roll means 10 to rotate, because of the frictional contact therebetween.

In some instances, it might be desirable to have a hold down roll, illustrated by numeral 66 in FIG. 2, so as to press the pipe member 16 firmly into the V-trough 14, and in this instance, some appropriate actuation means 68 to control roll 66 might be provided, again well known and understood by those skilled in the art.

For the purpose of using the feed apparatus of the invention for association with an ultrasonic testing apparatus to test the structural integrity of the pipe member 16, it should be understood that accurate control of the movement of the pipe 16 in its direction of rotation as shown by the double ended arrow 70, or its longitudinal movement as shown by the double ended arrow 72, as seen in FIG. 1, is necessary. This control is provided by the actuation means 60 and the drive means 62. The forward, reverse and speed control of the drive means 62 is controlled by an appropriate control means 63. Hence, it is critical to provide a suitable control through these means 60, 62 and 63 to adjust the positional relationship of pulley 36 and the rotational rate imparted by the driving of pulley 34. However, it is well known to those skilled in the art that suitable electrical or hydraulic controls to provide very precise and rapid changes to these relationshps are readily available, and do not incorporate a novel part of this invention. It should only be understood that for the use of the feed apparatus of the invention with testing equipment, the controls must be very precise and must respond rapidly to give the change in rotational rate or longitudinal transfer of shaft 26a desired.

Thus, it should be understood that the feed control in the invention is achieved by changing the horizontal component of the angle of the plane of rotation of the V-belts 46 with respect to the pipe member 16 and that this is achieved very simply by the longitudinal sliding of shaft 26a in either of the directions shown by the double ended arrow 52 of FIG. 1.

The invention contemplates that the pulleys 34 and 36 will have a total tilting range of from 0° to between 10° to 30° dependent upon the particular application desired and with this tilt taking place in either direction. The movement of pulleys 36 by the appropriate longitudinal sliding of shaft 26a, of course, causes the angular change of both pulleys 36 and 34 and consequently the angular relationship of V-belts 46 with respect to the pipe member 16.

THEORY OF FEED CONTROL

The plane of rotation of pulleys 34 and 36 actually changes with respect to a non-feeding perpendicular relation to the axes 20 of pipe member 16 and the axes 21 and 22 of shafts 26a and 26, respectively. It is this change in angular relationship of the second roll means 12 with respect to these axes which achieves the feed control. Therefore, if the rotative planes of pulleys 34 and 36 are perpendicular to the axis 20 of pipe member 16, no feed of the pipe member will occur, but it will simply rotate in the direction of arrow 70. However, assuming that the angle changes by pushing shaft 26a forward, the situation illustrated in FIG. 5 is achieved whereby with the pipe member 16 rotating in the direction of the solid arrow 74 the advance of pipe member 16 will be in the direction of the solid arrow 76. Conversely, if the pipe member 16 is rotating in the direction of the dotted arrow 74a the feed of pipe member 16 would be in the opposite direction, or in the direction of dotted arrow 76a. Naturally, the converse becomes true as illustrated in FIG. 6 when the pulley 36 is moved backward or is positioned behind the roll means 10. Hence, in the situation of FIG. 6 with the pipe member 16 rotating in the direction indicated by solid arrow 80, the feed will be in the direction of solid arrow 82. Conversely, with the direction of rotation of pipe member 16 in the direction of dotted arrow 80a, the pipe feed will be in the direction of dotted arrow 82a.

Thus, it should be readily understood that the direction of feed is dependent upon the direction of rotation of the pipe 16 and the angular relation of the plane of the V-belts to the plane of roll means 10. The rate of feed per revolution of member 16 is naturally dependent upon the amount of this angular relation. The rate of feed is greater with a larger angle, and decreases proportionally with a decrease in angle. It can, therefore, be seen that very minute and precise feed control can be achieved by a very small linear movement to shaft 26a causing a change in the angular relationship of V-belts 46. It is contemplated that the actual angle of the V-belts with respect to a plane perpendicular to the axis 20 of the pipe member 16 will never be more than between about 0 to 15 degrees for use with a testing apparatus of the ultrasonic type although it is apparent that the angle could vary considerably for other applications.

It is an important aspect of the invention that good frictional characteristics be developed between the pipe member 16 or other elongated cylindrical object and the roll means 10 and 12 or a plurality of such roll means if they are arranged in aligned series. To this end, the invention contemplates that some rubber or otherwise resilient surface having good frictional characteristics would best meet the objects of the invention. The longitudinal sliding friction between roll means 10 and the pipe member 16 should be low, however, to allow the pipe 16 to slide thereover without friction losses. A slight flexing of the disc 32 of roll means 10 at the point of contact with pipe 16 will assist in reducing friction losses of the pipe sliding thereover. Also, since roll means 10 is preferably just a support idler, its surface could be some low friction material such as teflon, for example.

Hence, it is seen that the objects of the invention have been achieved by providing at least one pair of cooperating roll means describing a V-trough for receipt of an elongated cylindrical object between, and whereby the angular relationship between one of the roll means with respect to the axis of the object can be varied and through frictional contact provide a transfer feed or advance of the cylindrical member dependent upon the angular relation of the one roll means and the rotational speed of the object as transmitted to the object through the rotation of at least one of the roll means. In order that the feed might be properly and accurately controlled, it is also a desirable structural aspect of the invention that the roll means capable of the variation in the angular relation which causes the feed, have a larger frictional engaging surface with the cylindrical member than the other supporting roll means, be it the driving roll means or merely an idler roll means. In other words, the roll means causing the feed or advancement should have higher longitudinal frictional characteristics then the other roll means. Naturally, this can be accomplished by having a larger or wider surface, or a surface with a high friction coefficient in the longitudinal direction. Hence, in the embodiment illustrated in FIG. 6, it will be seen that the surface area of the second roll means 12 is at least about two times the surface area of the roll means 10, although a relationship of 1 to 1 or even less, as seen in FIG. 5, will work, also. A range of operating criteria to this end would seem to make it preferable, however, that the angular variable roll means have at least about equal the contact area of the other roll means, be it an idler or a driver roll means.

The invention has been described with reference to the preferred embodiment. Obviously modifications and alterations will occur to others upon the reading and understanding of this specification. It is my intention to include all such modifications and alterations insofar as they come within the scope of the appended claims or the equivalents thereof.

What is claimed is:

1. Apparatus for simultaneously rotating and conveying a cylindrical member along its longitudinal axis which comprises:
   a. at least a first and second shaft;
   b. a plurality of spaced first rotatable roll means supported by one of said shafts;
   c. a plurality of spaced second rotatable roll means supported by both shafts and cooperating with said first roll means to form a V-shaped trough in which said member is supported;
   d. means to rotatably drive at least one of said roll means to impart rotation to said member about its axis of rotation; and
   e. means to adjust the plane of rotation of the second roll means so that it is in non-perpendicular relation to the longitudinal axis of said cylindrical member by moving one of said shafts along its longitudinal axis relative to the other.

2. Apparatus according to claim 1 wherein said second roll means comprises a pair of spaced pulleys, V-belt means extending between the pulleys, mounting means for said pulleys to allow self-aligning pivotal movement thereof, means to rotatably drive at least one of the pulleys, said pulleys being arranged so that the V-belt means lie in adjacent and substantially parallel relation to said first roll means to form a V-trough therebetween for receiving the cylindrical member.

3. Apparatus according to claim 2 wherein each of the pulleys is mounted on a spherical ball joint and pivotal about said joint in any plane which intersects the longitudinal axis of the cylindrical members.

4. Apparatus according to claim 1 where the surface contact area of said adjustable roll means is at least twice the surface contact area of said other roll means.

5. Apparatus according to claim 1 which includes hold down roll means to hold the cylindrical member into firm contact with the roll means in the trough therebetween.

6. Apparatus for simultaneously rotating and longitudinally advancing a cylindrical member which comprises:
   a. a first elongated common shaft parallel to the longitudinal axis of said cylindrical member,
   b. a plurality of rollers and pulleys rotatably mounted in spaced relation along the shaft,
   c. a second elongated common shaft, in parallel spaced relation to said first shaft,
   d. a plurality of pulleys rotatably mounted in spaced relation along said second shaft and belt means interconnecting each pulley on said first shaft with each pulley on said second shaft whereby said rollers and said belt means cooperatively define a V-shaped trough in which said cylindrical member is received,
   e. means to uniformly rotatably drive the pulleys on one of the shafts, and
   f. means to uniformly control the rate of longitudinal movement of said cylindrical members by varying the angle between the line of movement of said belt means and the longitudinal axis of said cylindrical members.

7. Apparatus according to claim 6 wherein each of the pulleys is mounted on a self-aligning spherical ball joint and pivotal in any plane which intersects with the longitudinal axis of said cylindrical member.

8. Apparatus according to claim 13 wherein said means to control the rate of movement further comprises means to permit longitudinal movement of one of said shafts while maintaining said shafts in parallel relationship.

* * * * *